United States Patent
Hayashi et al.

(10) Patent No.: US 6,970,343 B2
(45) Date of Patent: Nov. 29, 2005

(54) ALUMINUM ELECTROLYTIC CAPACITOR

(75) Inventors: Kazunari Hayashi, Uji (JP); Ryoko Takaoka, Hirakata (JP); Hisao Nagara, Uji (JP); Kazumitsu Honda, Hirakata (JP); Yoshihiro Watanabe, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 30 days.

(21) Appl. No.: 11/069,984

(22) Filed: Mar. 3, 2005

(65) Prior Publication Data

US 2005/0195557 A1  Sep. 8, 2005

(30) Foreign Application Priority Data

Mar. 3, 2004 (JP) .............................. 2004-058419

(51) Int. Cl.[7] .......................... H01G 9/02; H01M 6/04
(52) U.S. Cl. ................... 361/504; 361/511; 252/62.2
(58) Field of Search ........................ 361/502, 503–507, 361/511–512; 252/62.2

(56) References Cited

U.S. PATENT DOCUMENTS 6,185,089 B1 * 2/2001 Mita et al. .................. 361/502
6,621,684 B2 * 9/2003 Shimamoto et al. ........ 361/502
6,671,166 B1 * 12/2003 Penneau et al. ............ 361/504

FOREIGN PATENT DOCUMENTS

| JP | 5-226189 | 9/1993 |
|----|----------|--------|
| JP | 2001-313234 | 11/2001 |

* cited by examiner

*Primary Examiner*—Eric W. Thomas
(74) *Attorney, Agent, or Firm*—Wenderoth, Lind & Ponack, L.L.P.

(57) ABSTRACT

An aluminum electrolytic capacitor produced by winding an anode foil 11 and a cathode foil 12 via a separator 13 impregnated with a driving electrolyte solution 14, wherein the driving electrolyte solution 14 comprises a polar solvent, at least one electrolyte selected from inorganic acids, organic acids, inorganic acid salts, and organic acid salts, and a random copolymer of polyoxyethylene and polyoxypropylene having a hydroxy group at one end and a hydrogen group at the other end and the separator 13 is formed by overlaying a cellulosic fiber-mixed paper, a cellulosic fiber paper, and a cotton linter. The present invention provides a long-lasting driving electrolyte solution higher in electric conductivity and superior in the chemical self-restoring ability and heat resistance at high temperature, and an aluminum electrolytic capacitor using the same.

4 Claims, 1 Drawing Sheet

ALUMINUM ELECTROLYTIC CAPACITOR

BACKGROUND OF THE INVENTION

Field of the Invention

The present invention relates to an aluminum electrolytic capacitor for use in various electronic devices.

A configuration of the aluminum electrolytic capacitor according to the present invention is shown in FIG. 1. The FIGURE is a partial cross-sectional perspective view.

A capacitor element 19 in FIG. 1 is prepared by winding an anode foil 11 and a cathode foil 12 via a separator 13, wherein the anode foil 11 is obtained by etching a surface of an aluminum foil to increase its effective surface area and subjecting the surface to a chemical conversion treatment to form a dielectric oxide film thereon, and the cathode foil 12 is obtained by etching a surface of an aluminum foil. The aluminum electrolytic capacitor 19 can be produced by connecting an anode lead terminal 15 and an cathode lead terminal 16 respectively to the anode foil 11 and the cathode foil 12, impregnating the capacitor element with a driving electrolyte solution 14, placing the capacitor element 19 in a metal case 18 such as aluminium case, and sealing the opening with a sealing plate 17, for example, of rubber.

Many ion-conductive liquids, including those containing an organic solvent such as ethylene glycol or γ-butyllactone and an electrolyte such as boric acid or ammonium borate, have been used as the driving electrolyte solution 14. Alternatively, non-aqueous electrolyte solutions containing one of dibasic acids having a side-chain such as azelaic acid, butyloctanedicarboxylic acid, and 5,6-decanedicarboxylic acid, or the salts thereof as the electrolyte, which allows reduction of water in the driving electrolyte solution 14, are said to be effective in suppressing unintended release of the valves in the aluminum electrolytic capacitor due to the increase in internal pressure by water even in an environment of 100° C. or more.

However, the nonaqueous driving electrolyte solutions 14 causes faster degradation of the electrolyte solution in an esterification reaction at high temperature, and thus dibasic acids having a side-chains such as butyloctanedicarboxylic acid, 5,6-decanedicarboxylic acid, and 1,7-octanedicarboxylic acid or the salts thereof have been used in an electrolyte effective in suppressing the esterification reaction.

Prior art references relevant to the present invention include, for example, Jpn. Unexamined Patent Publication Nos. 05-226189 and 2001-313234.

Recently, for aluminum electrolytic capacitors for use in anti-harmonic distortion circuits and vehicles, there exists a need for a driving electrolyte solution 14 that is higher in electric conductivity, superior in the spark voltage and the life at high temperature, resistant to the breakdown of dielectric oxide films on electrodes, superior in film-repairing ability for repairing the defects once formed in the dielectric oxide film (hereinafter, referred to as chemical self-restoring ability), and capable of suppressing chemical reactions at high temperature.

However, when a dibasic acid having a side-chain or the salt thereof is used as the electrolyte of a driving electrolyte solution 14, the capacitor is likely to be less heat resistance at high temperature, because the dibasic acid has a side-chain only in the vicinity of the carboxyl group at one side. Also, the electric conductivity of the electrolyte solution is likely to be lowering, which may cause deteriorating the performance of the aluminum electrolytic capacitor, because the carboxyl group of the electrolyte reacts more with an alcohol such as ethylene glycol in the esterification reaction when the capacitor is used for a prolonged period.

In addition, the compounds above have an advantage that increase in the amount and the molecular weight thereof leads to increase in spark voltage, but on the contrary, become less soluble in organic solvents especially at lower temperature, resulting in precipitation. This restricts the range of the content or the molecular weight of the compound. Accordingly, these compounds have good solubility at lower temperature when they have a molecular weight of 1,000 or less. However, as described above, reduction of the molecular weight lead to an insufficient spark voltage and possible short-circuit explosion during aging of the product. Thus, there exist trade-off problems when these compounds are used for an electrolyte.

Additionally, papers commonly used as separators 13 for general aluminum electrolytic capacitors such as Manila paper, kraft paper, and esparto paper have a high density. Reduction of the density is likely to be less short-circuit resistance and to lower tensile strength.

BRIEF SUMMARY OF INVENTION

The present invention is made to solve the aforementioned problems, and an object thereof is to provide a high-ripple, long-lasting driving electrolyte solution higher in electric conductivity and superior in chemical self-restoring ability and heat resistance at high temperature, and an aluminum electrolytic capacitor using the same.

For the purpose of achieving the object above, the present invention provides an aluminum electrolytic capacitor produced by winding an anode foil and a cathode foil via a separator impregnated with a driving electrolyte solution, wherein the driving electrolyte solution contains a polar solvent, at least one electrolyte selected from inorganic acids, organic acids, inorganic acid salts, and organic acid salts, and a random copolymer of polyoxyethylene and polyoxypropylene having a hydroxy group at one end and a hydrogen group at the other end, and the separator is formed by over laying a cellulosic fiber-mixed paper, a cellulosic fiber paper, and a cotton linter.

The present invention provides an aluminum electrolytic capacitor for use in anti-harmonic distortion circuits and vehicles that is superior in the reliability and stability, for example, withstanding voltage, heat resistance, ripple, life time, and vibration resistance.

DETAILED DESCRIPTION OF INVENTION

Figure 1:
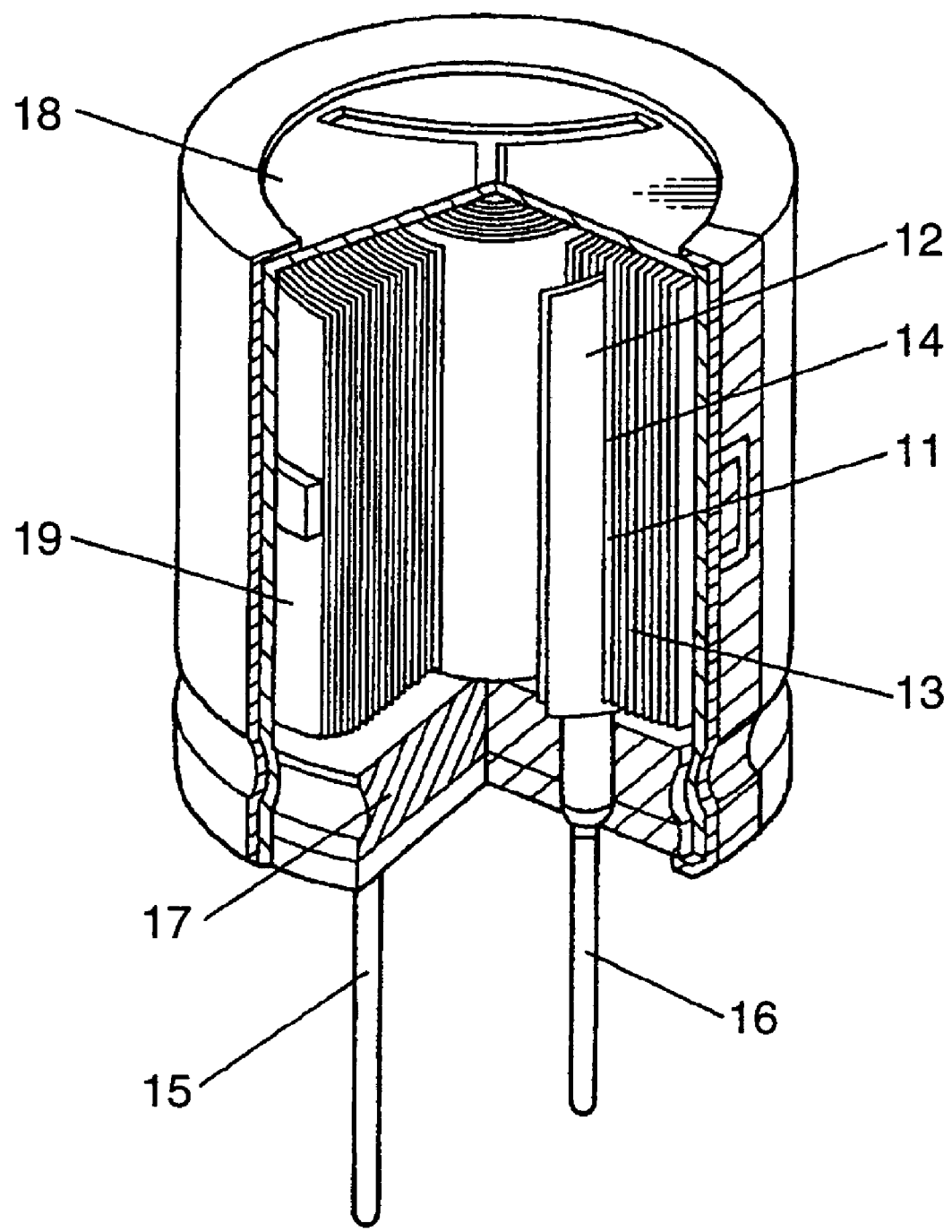
FIG. 1 is a partial cross-sectional perspective view showing the configuration of an aluminum electrolytic capacitor.

The aluminum electrolytic capacitor in an embodiment of the present invention has a configuration identical with that of the conventional aluminum electrolytic capacitors described above and for convenience, will be described with reference to FIG. 1. The capacitor element 19 is formed by anode foil 11 and cathode foil 12 opposing to each other, which are wound together with intervening separator 13. Anode foil 11 is an aluminum foil, the effective surface area of foil 11 is enlarged through etching process and the surface is provided with a dielectric oxide film formed through anode oxidation process. It is provided with anode lead 15. Cathode foil 12 is also formed of an etched aluminum foil, and provided with cathode lead 16. The capacitor element 19 is placed inside an aluminum case 18 after it is immersed in a driving electrolyte solution 14, and the opening of the metal case 18 is sealed with a sealing plate 17, to form an electrolyte capacitor.

The driving electrolyte solution 14 contains a polar solvent; at least one electrolyte selected from inorganic acids, organic acids, inorganic acid salts, and organic acid salts; and a random copolymer of polyoxyethylene and polyoxypropylene having a hydroxy group at one end and a hydrogen group at the other end.

Examples of the polar solvents include ethylene glycol, propylene glycol, 1,4-butanediol, glycerine, polyoxyalkylene polyols (polyethylene oxide, polypropylene oxide, polyoxyethylene-oxypropylene glycol having a molecular weight of 200 or less, and the mixtures of two or more), amide solvents (N-methylformamide, N,N-dimethylformamide, N-methylacetamide, N-methylpyrrolidinone, etc.), alcohol solvents (methanol, ethanol, etc.), ether solvents (methylal, 1,2-dimethoxyethane, 1-ethoxy-2-methoxyethane, 1,2-diethoxyethane, etc.), nitrile solvents (acetonitrile, 3-methoxypropionitrile, etc.), furan solvents (2,5-dimethoxytetrahydrofuran, etc.), sulfolane solvents (sulfolane, 3-methylsulfolane, 2,4-dimethylsulfolane, etc.), carbonate solvents (propylene carbonate, ethylene carbonate, diethyl carbonate, styrene carbonate, dimethyl carbonate, or methyl ethyl carbonate, etc.), lactone solvents (γ-butylolactone, γ-valerolactone, δ-valerolactone, 3-methyl-1,3-oxazolidine-2-one, 3-ethyl-1,3-oxazolidine-2-one, etc.), imidazolidinone solvents (1,3-dimethyl-2-imidazolidinone, etc.), and pyrrolidone solvents and the mixture of two or more, and the like. Among these solvents, ethylene glycol, propylene glycol, diethyleneglycol, water, lactone solvents, alcohol solvents, carbonate solvents, ether solvents, nitrile solvents and furan solvents are preferable. The amount of the polar solvent is preferably 50 to 80% by mass with respect to the total amount of the electrolyte solution.

The electrolyte contains at least one compound selected from inorganic acids, organic acids, inorganic acid salts, and organic acid salts. Favorable examples among them include boric acid, phosphoric acid, benzoic acid, dibasic acids such as azelaic acid, adipic acid, glutaric acid, phthalic acid, maleic acid, 5,6-decanedicarboxylic acid, 1,7-octanedicarboxylic acid, and 1,6-decanedicarboxylic acid. These and salts thereof can be used as the electrolyte. The salts above favorably used include ammonium salts, amine salts, quaternary ammonium salts, amidine salts, and the like.

The ammonium salt is, for example, a salt of an inorganic or organic acid; examples of the amines for the amine salt include primary amines (methylamine, ethylamine, propylamine, butylamine, ethylenediamine, etc.), secondary amines (dimethylamine, diethylamine, dipropylamine, methylethylamine, diphenylamine, diethanolamine, etc.), and tertiary amines (trimethylamine, triethylamine, tripropylamine, triphenyl amine, triethanolamine, etc.); and examples the amidines for the amidine salt include compounds having an alkyl-substituted amidine group, compounds having a quaternarized alkyl-substituted amidine group, and imidazole, benzimidazole, and alicyclic amidine compounds quaternarized with an alkyl or arylalkyl group having 1 to 11 carbons.

Specific examples of the compounds having a quaternarized alkyl-substituted amidine groups include 1-methyl-1,8-diazabicyclo[5,4,0]undecene-7, 1-methyl-1,5-diazabicyclo[4,3,0]nonene-5, 1,2,3-trimethylimidazolinium, 1,2,3,4-tetramethylimidazolinium, 1,2-dimethyl-3-ethyl-imidazolinium, 1,3,4-trimethyl-2-ethylimidazolinium, 1,3-dimethyl-2-heptylimidazolinium, 1,3-dimethyl-2-(3'-heptyl) imidazolinium, 1,3-dimethyl-2-dodecylimidazolinium, 1,2,3-trimethyl-1,4,5,6-tetrahydropyrimidinium, 1,3-dimethylimidazolinium, 1-methyl-3-ethyl-imidazolinium, and 1,3-dimethylbenzimidazolinium. The content of the electrolyte in the electrolyte solution is preferably 10 to 30% by mass with respect to the total amount of the electrolyte solution.

In addition, the random copolymer of polyoxyethylene and polyoxypropylene having a hydroxy group at one end and a hydrogen group at the other end has a structure represented by the following General Formula (1).

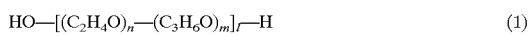

$$\text{HO}-[(C_2H_4O)_n-(C_3H_6O)_m]_l-\text{H} \tag{1}$$

(n, m, and l each represent an integer.)

The copolymers having a hydroxy group at one end and a hydrogen group at the other end have excellent solubility in polar solvents and exhibit its advantageous effects more effectively.

Favorable repeating numbers of the monomer units of oxyethylene and oxypropylene, n and m, in the random copolymer are preferably 1 to 7 and 1 to 8 respectively. In addition, the number of repeating unit l of the copolymer is preferably 1 to 10; and the weight-average molecular weight is more preferably 1,000 to 3,000. The weight-average molecular weight is a value calculated from the hydroxyl value determined according to the method specified by JIS K 1557.

In addition, the composition ratio of polyoxyethylene to polyoxypropylene in the random copolymer is preferably 1/9 to 9/1 and more preferably 1/9 to 5/5 as the weight ratio of polyethylene glycol to polypropylene glycol.

The content of the random copolymer in electrolyte solution is preferably 1 to 5% by mass with respect to the total amount of electrolyte solution.

The separator 13 has a structure formed by overlaying a cellulosic fiber-mixed paper, a cellulosic fiber paper, and a cotton linter. The method for overlaying these fibers is not particularly limited, and, for example, the separator may be prepared by overlaying the respective fiber one by one and integrating the fibers by pressing the composite layer by means of a roller or the like. Alternatively, the separator may be prepared by first preparing double sheets of a cellulosic fiber-mixed paper and a cellulosic fiber and then laying the double sheets over a cotton linter. The cotton linter is preferably formed as the outer layer when overlaid. Preferably, the cellulosic fiber-mixed paper, the cellulosic fiber, and the cotton linter are overlaid in that order. The separator is preferably placed in such a manner that the cellulosic fiber-mixed paper and cotton linter face the electrode foils. The cellulosic fiber according to the present invention contains at least one fiber selected from Manila jute, kraft, hemp, and esparto.

The separator according to the present invention has a dense structure wherein the distance among the fibers is smaller, but contains a great number of narrow through-holes. The structure permits reduction of the resistance loss of capacitor without decreasing the electric conductivity of the electrolyte solution and also improvement of the short-circuit resistance. The thickness of the separator in the present invention is preferably 40 to 80 μm. The thickness of the cotton linter layer in the separator is preferably 20 to 60 μm. The thickness of the separator excluding the cotton linter layer, i.e., the thickness of the cellulosic fiber-mixed paper and the cellulosic fiber paper may be decided arbitrarily, but the both papers may have the same thickness substantively. Although other fibers may be used in the separator according to the present invention in combination with the fibers above, separators consisting essentially of the fibers described above are preferable, and separators consisting of a cellulosic fiber-mixed paper, a cellulosic fiber paper and a cotton linter are particularly preferable.

The basis weight of the separator is preferably 1 to 60 g/m$^2$. In contrast to conventional electrolyte solutions, which often lead to short circuiting and thus was unable to provide stabilized performance when a low-basis weight separator was used, use of the driving electrolyte solution according to the present invention enables physically securing the anode-cathode distance of the capacitor and thus leads to improvement of the stability in withstand voltage, allowing use of a low-basis weight separator in medium- to high-voltage capacitors, which has been hitherto difficult, and providing favorable capacitor performance. In particular, use of the separator above enables drastic reduction of the resistance due to the separator in the electrolytic capacitor, and is thus effective in reducing the equivalent series resistance (ESR) and the impedance of the capacitor.

A separator having a basis weight of less than 1 g/m$^2$ does not have a sufficient short-circuit resistance, and a separator of more than 60 g/m$^2$ have an increased short-circuit resistance but shows rather poor capacitor performance. The most favorable range of the basis weight is 10 to 40 g/m$^2$.

The basis weight is calculated as a product of the density and the thickness of separator.

The separator 13 above may be subjected to a paper-strength reinforcement processing for improvement in the tensile strength of separator 13. The paper-strength reinforcement processing improves the tensile strength as well as the short-circuit resistance of the separator.

The paper-strength reinforcement processing may be carried out by applying an aqueous solution of starch, vegetable gum, carboxyalkylcellulose, polyoxyalkylene phthalate, or the like onto the separator 13 or impregnating the separator with the solution.

Any one of hitherto known aluminium foils may be used as the electrode foil according to the present invention. The anode foil may be produced by forming a dielectric oxide film by chemical conversion on an aluminium foil surface having an effective surface area expanded by etching. Alternatively, the cathode foil may be prepared by etching an aluminium foil.

Hereinafter, the present embodiment will be described in detail with reference to EXAMPLES.

EXAMPLE 1

A capacitor element was prepared by winding an anode foil and a cathode foil via a separator. The anode foil is prepared by surface-roughening an aluminum foil by DC etching while making tunnel-shaped pits vertically from the surface and forming a dielectric oxide film (forming voltage 520 V) on the surface by anodization. Cathode foil is an AC etched aluminium foil. The separator has a structure formed by overlaying a cotton linter and double sheets of a kraft-mixed paper and an esparto paper in the order of a kraft-mixed paper, an esparto and a cotton linter (total thickness: 50 μm, kraft layer: 15 μm, esparto layer: 15 μm, cotton linter layer: 20 μm, and basis weight: 25 g/m$^2$).

The capacitor element above is then impregnated with each of the electrolyte solutions. Each of compositions for driving electrolyte solutions is shown in TABLE 1.

Each copolymer in the driving electrolyte solutions is a random copolymer of polyoxyalkylene and polyoxypropylene having a hydroxy group at one end and a hydrogen group at the other end, and the weight ratio of polyethylene glycol to polypropylene glycol, and the weight-average molecular weight of each copolymer is shown in TABLE 2.

TABLE 1

| | Composition of driving electrolyte solution | Amount mass % | Electric conductivity (mS/cm) | Spark voltage (V) |
|---|---|---|---|---|
| Electrolyte solution A | Ethylene glycol | 71.8 | 2.4 | 480 |
| | Ammonium benzoate | 10 | | |
| | Ammonium 1,7-octandicarboxylate | 16 | | |
| | Ammonium hypophosphite | 0.2 | | |
| | Copolymer 1 | 2 | | |
| Electrolyte solution B | Ethylene glycol | 72.5 | 2.2 | 460 |
| | p-Nitrobenzoic acid | 10 | | |
| | Diammoium azelate | 14 | | |
| | Monobutylphosphate | 0.5 | | |
| | Copolymer 2 | 3 | | |
| Electrolyte solution C | Ethylene glycol | 69.8 | 2.4 | 485 |
| | Ammonium benzoate | 10 | | |
| | Diammoium azelate | 13 | | |
| | Glycerine | 5 | | |
| | Ammonium hypophosphite | 0.2 | | |
| | Copolymer 3 | 2 | | |
| Electrolyte solution D | Ethylene glycol | 56.5 | 2.7 | 495 |
| | p-Nitrobenzoic acid | 10 | | |
| | Ammonium 1,7-octandicarboxylate | 30 | | |
| | Ammonium hypophosphite | 0.5 | | |
| | Copolymer 4 | 3 | | |
| Electrolyte solution E | Ethylene glycol | 71.8 | 2.6 | 490 |
| | Ammonium benzoate | 10 | | |
| | Ammonium 1,7-octandicarboxylate | 16 | | |
| | Ammonium hypophosphite | 0.2 | | |
| | Copolymer 5 | 2 | | |
| Electrolyte solution F | Ethylene glycol | 74.8 | 1.6 | 430 |
| | Ammonium benzoate | 10 | | |
| | Diammoium azelate | 10 | | |
| | Glycerine | 5 | | |
| | Ammonium hypophosphite | 0.2 | | |

TABLE 2

| | Ratio of polyoxyethylene to polyoxypropylene | Molecular weight |
|---|---|---|
| Copolymer 1 | 1:9 | 3,000 |
| Copolymer 2 | 2:8 | 3,000 |
| Copolymer 3 | 3:7 | 2,000 |
| Copolymer 4 | 4:6 | 2,000 |
| Copolymer 5 | 5:5 | 1,000 |

Subsequently, each of the capacitor elements above is placed in a cylindrical aluminium metal case having a bottom plate and the opening of the metal case was sealed with a cured-butyl rubber sealant (butyl rubber polymer: 30 parts by mass, carbon: 20 parts by mass, inorganic filler: 50 parts by mass, sealant hardness: 70 IRHD [international rubber hardness unit]) by a curling treatment, to give an aluminum electrolytic capacitor.

EXAMPLE 2

An aluminum electrolytic capacitor was prepared in a similar manner to EXAMPLE 1, except that a separator formed by laying double sheets of a Manila jute-mixed paper and a hemp paper over a cotton linter (total thickness 50% μm, Manila jute layer: 15 μm, hemp layer: 15 μm, cotton linter layer: 20 μm, and basis weight 25 g/m$^2$) was used replacing the separator used in EXAMPLE 1.

EXAMPLE 3

An aluminum electrolytic capacitor was prepared in a similar manner to EXAMPLE 1, except that a separator formed by laying double sheets of a hemp-mixed paper and a kraft paper over a cotton linter (total thickness: 50 μm, hemp layer: 15 μm, kraft layer: 15 μm, cotton linter layer: 20 μm, and basis weight: 25 g/m$^2$) was used replacing the separator used in EXAMPLE 1.

EXAMPLE 4

An aluminum electrolytic capacitor was prepared in a similar manner to EXAMPLE 1, except that a separator formed by laying double sheets of a hemp-mixed paper and a kraft paper over a cotton linter (total thickness: 50 μm, hemp layer: 15 μm, kraft layer: 15 μm, cotton linter layer: 20 μm, and basis weight: 1 g/m$^2$) was used replacing the separator used in EXAMPLE 1.

EXAMPLE 5

An aluminum electrolytic capacitor was prepared in a similar manner to EXAMPLE 1, except that a separator formed by laying double sheets of a hemp-mixed paper and a kraft paper over a cotton linter (total thickness: 50 μm, hemp layer: 15 μm, kraft layer: 15 μm, cotton linter layer: 20 μm, and basis weight: 10 g/m$^2$) was used replacing the separator used in EXAMPLE 1.

EXAMPLE 6

An aluminum electrolytic capacitor was prepared in a similar manner to EXAMPLE 1, except that a separator formed by laying double sheets of a hemp-mixed paper and a kraft paper over a cotton linter (total thickness: 50 μm, hemp layer: 15 μm, kraft layer: 15 μm, cotton linter layer: 20 μm, and basis weight: 40 g/m$^2$) was used replacing the separator used in EXAMPLE 1.

EXAMPLE 7

An aluminum electrolytic capacitor was prepared in a similar manner to EXAMPLE 1, except that a separator formed by laying double sheets of a hemp-mixed paper and a kraft paper over a cotton linter (total thickness: 50 μm, hemp layer: 15 μm, kraft layer: 15 μm, cotton linter layer: 20 μm, and basis weight: 60 g/m$^2$) was used replacing the separator used in EXAMPLE 1.

EXAMPLE 8

An aluminum electrolytic capacitor was prepared in a similar manner to EXAMPLE 1, except that a separator formed by laying double sheets of a hemp-mixed paper and a kraft paper over a cotton linter (total thickness: 50 μm, hemp layer: 15 μm, kraft layer: 15 μm, cotton linter layer: 20 μm, and basis weight: 80 g/m$^2$) was used replacing the separator used in EXAMPLE 1.

EXAMPLE 9

An aluminum electrolytic capacitor was prepared in a similar manner to EXAMPLE 1, except that a separator formed by laying double sheets of a hemp-mixed paper and a kraft paper over a cotton linter (total thickness: 50 μm, hemp layer: 15 μm, kraft layer: 15 μm, cotton linter layer: 20 μm, and basis weight: 25 g/m$^2$) that is further impregnated with an aqueous solution of a carboxyalkylcellulose for improvement in paper strength was used as the separator replacing the separator used in EXAMPLE 1.

EXAMPLE 10

An aluminum electrolytic capacitor was prepared in a similar manner to EXAMPLE 1, except that the electrolyte solution B was used replacing the driving electrolyte solution of EXAMPLE 1.

EXAMPLE 11

An aluminum electrolytic capacitor was prepared in a similar manner to EXAMPLE 1, except that the electrolyte solution C was used replacing the driving electrolyte solution of EXAMPLE 1.

EXAMPLE 12

An aluminum electrolytic capacitor was prepared in a similar manner to EXAMPLE 1, except that the electrolyte solution D was used replacing the driving electrolyte solution of EXAMPLE 1.

EXAMPLE 13

An aluminum electrolytic capacitor was prepared in a similar manner to EXAMPLE 1, except that the electrolyte solution E was used replacing the driving electrolyte solution of EXAMPLE 1.

COMPARATIVE EXAMPLE 1

An aluminum electrolytic capacitor was prepared in a similar manner to EXAMPLE 1, except that the electrolyte solution F was used replacing the driving electrolyte solution of EXAMPLE 1.

COMPARATIVE EXAMPLE 2

An aluminum electrolytic capacitor was prepared in a similar manner to EXAMPLE 1, except that a separator of a mixed paper of Manila jute and kraft (total thickness: 50 μm, and basis weight: 25 g/m$^2$) was used replacing the separator of EXAMPLE 1.

Twenty pieces of aluminum electrolytic capacitors of EXAMPLES 1 to 13 and COMPARATIVE EXAMPLES 1 and 2 were prepared respectively; the life tests thereof were performed; and the results are summarized in TABLE 3. The rated outputs of the aluminum electrolytic capacitors were respectively 47 μF at 400 V, and ripple load tests were performed at a test temperature of 105° C.

TABLE 3

| | Initial properties | | After 200 hr of ripple load at 105° C. | | | |
|---|---|---|---|---|---|---|
| | tand (%) | LC (μA) | ΔC (%) | tand (%) | LC (μA) | ESR (Ω) |
| EXAMPLE 1 | 4.3 | 24 | −0.3 | 6.7 | 13 | 0.054 |
| EXAMPLE 2 | 4.3 | 23 | −0.5 | 6.6 | 12 | 0.030 |
| EXAMPLE 3 | 4.1 | 25 | −0.4 | 6.8 | 14 | 0.044 |
| EXAMPLE 4 | 4.2 | 29 | −0.8 | 7.9 | 21 | 0.001 |
| EXAMPLE 5 | 4.8 | 25 | −0.7 | 6.5 | 17 | 0.010 |
| EXAMPLE 6 | 4.4 | 26 | −0.5 | 6.6 | 14 | 0.089 |

TABLE 3-continued

|  | Initial properties | | After 200 hr of ripple load at 105° C. | | | |
| --- | --- | --- | --- | --- | --- | --- |
|  | tand (%) | LC (μA) | ΔC (%) | tand (%) | LC (μA) | ESR (Ω) |
| EXAMPLE 7 | 4.7 | 25 | −0.4 | 7.0 | 13 | 0.168 |
| EXAMPLE 8 | 5.2 | 24 | −0.5 | 7.7 | 14 | 0.192 |
| EXAMPLE 9 | 4.5 | 24 | −0.5 | 6.5 | 12 | 0.058 |
| EXAMPLE 10 | 4.3 | 23 | −0.4 | 6.6 | 13 | 0.056 |
| EXAMPLE 11 | 4.4 | 25 | −0.3 | 6.6 | 12 | 0.055 |
| EXAMPLE 12 | 4.4 | 24 | −0.4 | 6.7 | 14 | 0.058 |
| EXAMPLE 13 | 4.5 | 24 | −0.5 | 6.7 | 13 | 0.060 |
| COMPARATIVE EXAMPLE 1 | 10.2 | 56 | −8.7 | 14.0 | 89 | 0.113 |
| COMPARATIVE EXAMPLE 2 | Short circuiting during aging, 20/20 | | | | | |

From the results in TABLE 1, it is apparent that the driving electrolytes A to E containing a random copolymer of polyoxyalkylene and polyoxypropylene having a hydroxy group at one end and a hydrogen group at the other end have an electrical conductivity and a spark voltage higher than those of the driving electrolyte solution F not containing the random copolymer.

From the results in TABLE 3, it is also apparent that combination of a driving electrolyte solution containing a random copolymer of polyoxyalkylene and polyoxypropylene having a hydroxy group at one end and a hydrogen group at the other end and a separator having a structure formed by laying double sheets of a cellulosic fiber-mixed paper, a cellulosic fiber paper over a cotton linter, improves the properties such as change in capacity (ΔC), tan δ, LC (Leak Current), and ESR after ripple load test, compared to the cases of COMPARATIVE EXAMPLE 1 not using a random copolymer and COMPARATIVE EXAMPLE 2 not using the cotton linter.

As shown in EXAMPLES 4 to 8, increase in the basis weight of separator is accompanied with increase in tan δ, LC, and ESR, and thus the basis weight is preferably in the range of 10 to 40 g/m².

As described above in detail, the aluminum electrolytic capacitor according to the present invention is an aluminum electrolytic capacitor produced by winding an anode foil and a cathode foil via a separator impregnated with a driving electrolyte solution, wherein the driving electrolyte solution contains a polar solvent, at least one electrolyte selected from inorganic acids, organic acids, inorganic acid salts, and organic acid salts, and a random copolymer of polyoxyalkylene and polyoxypropylene having a hydroxy group at one end and a hydrogen group at the other end, and the separator is formed by overlaying a cellulosic fiber-mixed paper, a cellulosic fiber paper, and a cotton linter. In the present invention, the random copolymer of polyoxyalkylene and polyoxypropylene having a hydroxy group at one end and a hydrogen group at the other end is a copolymer of a polyoxyalkylene that is superior in the solubility in polar solvents but have a drawback of high crystallinity and a polyoxypropylene that is lower in the solubility in polar solvents but lower in crystallinity, compensating the drawbacks of each other; and thus, use of the random copolymer overcomes the problem of precipitation at lower temperature. Such a random copolymer also expands the range of usable amount and molecular weight and raises the spark voltage and improves the efficiency of chemical self-restoring ability forming the chemical conversion film.

In addition, use of a random copolymer, which contains monomers more randomly distributed, results in an orientation of the copolymer at the air-liquid interface relatively sparser than that of block copolymers. The structure raises the surface tension, suppressing foaming of the electrolyte containing the random copolymer during impregnation to the capacitor element, and consequently the impregnation efficiency of a driving electrolyte solution to the capacitor element is improved.

In addition, the cotton linter in the separator according to the present invention has a shorter fiber having a fibril network structure, although it is rater thicker. Thus, the fine fibers are connected to each other at a numerous number of adhesion points. Accordingly, the separator according to the invention has a surface area greater than those of other separators when overlaying a cellulosic fiber-mixed paper, a cellulosic fiber paper, and a cotton linter. Thereby, a electrolyte-holding capacity of the separator increases, the advantageous effects of the random copolymer of polyoxyalkylene and polyoxypropylene are obtained more efficiently, and the resistance loss of capacitor lowers. Thus, the aluminum electrolytic capacitor of the present invention provides superior properties in short-circuit resistance, withstand voltage, heat resistance, ripple, life, and stability.

In the present invention described so far in details, all description is provided here only to illustrate the present invention by embodiments, and thus the present invention is not limited thereto. It should be understood that numerous modifications not exemplified here are also possible in the scope of the invention.

This application is based on Japanese Patent Application No.2004-58419 filed on Mar. 3, 2004, the contents of which are hereby incorporated by references.

What is claimed is:

1. An aluminum electrolytic capacitor produced by winding an anode foil and a cathode foil via a separator impregnated with a driving electrolyte solution, wherein:
   the driving electrolyte solution contains a polar solvent, at least one electrolyte selected from inorganic acids, organic acids, inorganic acid salts, and organic acid salts, and a random copolymer of polyoxyethylene and polyoxypropylene having a hydroxy group at one end and a hydrogen group at the other end; and
   the separator is formed by overlaying a cellulosic fiber-mixed paper, a cellulosic fiber paper, and a cotton linter.

2. The aluminum electrolytic capacitor according to claim 1, wherein the cellulosic fiber contains at least one fiber selected from Manila jute, kraft, hemp, and esparto.

3. The aluminum electrolytic capacitor according to claim 1, wherein the basis weight of the separator is in the range of 1 to 60 g/m².

4. The aluminum electrolytic capacitor according to claim 1, wherein the separator is previously subjected to paper-strength reinforcement processing.

* * * * *